(12) United States Patent
Chang (10) Patent No.: US 8,331,755 B2
(45) Date of Patent: Dec. 11, 2012

(54) LIGHT GUIDE MODULE WITH MULTI-DIRECTIONAL LIGHT-EMITTING AREAS

(75) Inventor: Szu-Tsung Chang, Taipei (TW)

(73) Assignee: Inventec Appliances Corp., Taipei Hsien (TW)

( * ) Notice: Subject to any disclaimer, the term of this patent is extended or adjusted under 35 U.S.C. 154(b) by 1071 days.

(21) Appl. No.: 12/232,773

(22) Filed: Sep. 24, 2008

(65) Prior Publication Data

US 2009/0086502 A1 Apr. 2, 2009

(30) Foreign Application Priority Data

Sep. 28, 2007 (TW) ................................ 96216181 U (51) Int. Cl.
*G02B 6/10* (2006.01)
(52) U.S. Cl. .................... 385/146; 385/901; 362/559
(58) Field of Classification Search .................. 385/146; 362/559
See application file for complete search history.

(56) References Cited

U.S. PATENT DOCUMENTS

| 5,857,761 A * | 1/1999 | Abe et al. ...................... 362/551 |
| 6,910,783 B2 * | 6/2005 | Mezei et al. .................. 362/615 |
| 7,695,179 B2 * | 4/2010 | Eichelberger ................. 362/620 |

* cited by examiner

*Primary Examiner* — Sarah Hahm
(74) *Attorney, Agent, or Firm* — Rosenberg, Klein & Lee (57) ABSTRACT

A multi-axial light guide module comprises a light guide, a light-emitting unit, a display unit and a light-guiding unit. The light guide has a light-emitting portion connects to a curved portion, wherein the light-emitting portion has at least two axial light-emitting planes to generate at least two axial light-emitting effects; the display unit has a first axial display layer corresponding to a first axial light-emitting plane, and a second axial display layer corresponding to a second axial light-emitting plane; the light-guiding unit is disposed on the light emitting portion, so as to enhance the light-emitting efficiency of the light-emitting portion; and, through the display unit and the light-guiding unit, the light-emitting and display effects of the multi-axial light-emitting plane on the light-emitting portion can be improved. Thereby, users may conveniently see the light-emitting display from different axial planes, in order to achieve the purposes of message prompt and indication.

15 Claims, 6 Drawing Sheets

LIGHT GUIDE MODULE WITH MULTI-DIRECTIONAL LIGHT-EMITTING AREAS

BACKGROUND OF THE INVENTION

1. Field of the Invention

The present invention relates to a light guide module, in particular to a multi-axial light guide module constructed by means of the conjunction of the display unit corresponding to the axial light-emitting plane and the light-guiding unit, in which at least two axial light-emitting planes are formed on the light-emitting portion of the light guide.

2. Description of Related Art

As electronic, information and communication technologies progress, mobile telecom and information consumer devices have become indispensable products for daily lives of modern people, in particular small-sized electronic devices such as mobile phones, Personal Digital Assistants (PDA), wired phones, Audio/Video disc players or other relevant electronic devices for family use etc. The above-mentioned products and related devices are all equipped with keypad and status indication systems for message input, control and operation. Therefore, to assist the use of device in a dim, unclear environment, said electronic devices usually require functions of light display or indication. A common approach is to dispose one or more light-emitting tubes and light-emitting components on the circuit board of the electronic device, in which the light-emitting component can emit light to illuminate the back of the keypad or display panel, so as to clearly show the indicative symbol or notation marked on the key surface. While this technology can solve said problem of indication in a dim, unclear environment, its uneven distribution of light intensity presents another problem, in which the portions close to the light source are much brighter and may cause discomfort to human eyes; whereas, the portions far from the light source may be too dim to be clearly observed.

Hence, light guide may be employed to guide the light generated from light source to a prescribed position, or to transform it to a secondary light source of any specific shape, in order to solve the aforementioned problem of insufficient light source, and facilitate extensive application on keypad backlight system used in various cellular phones or PDA's. At the same time, it may be applied to status indication system installed in numerous electronic products, and communication apparatuses as well.

Figure 1:
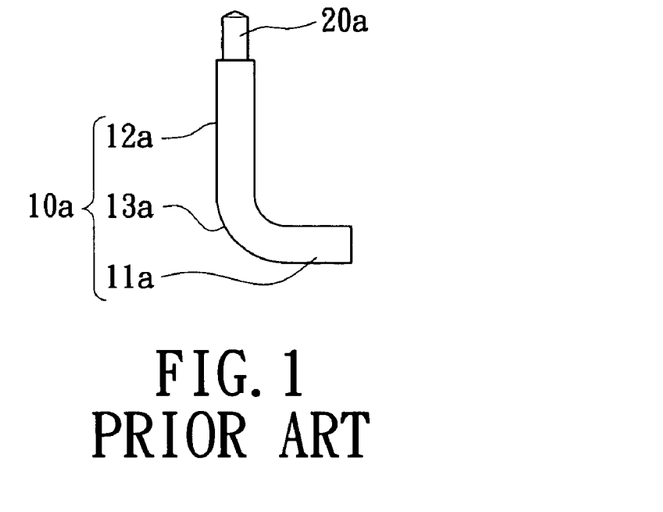
FIG. 1 is a diagram of a prior art light-guiding device.

Referring now to FIG. 1, a diagram of a prior art light-guiding device is shown. The light-guiding device comprises: a light guide 10a, and a lens 20a disposed on one end of the light guide 10a. The light guide 10a is in an arc shape, which has a light-receiving end 11a, a light-emitting end 12a and a connecting end 13a connected between the light-receiving end 11a and the light-emitting end 12a. Herein the connecting end 13a is in a curve arc shape for changing the direction of light guidance. The light guide 10a receives light using the light-receiving end 11a, and received light transfers to the light-emitting end 12a through the connecting end 13a, achieving thereby the effects of light guidance and emission.

However, during the transfer of light in the light guide 10a, as the light guidance refracts to the connecting end 13a, due to the curve arc shape thereof, it may cause too much light loss, and light diffuses out through the surface of the light guide 10a from the connecting end 13a, significantly reducing the ratio of light usage.

Accordingly, to obtain a desired level of light intensity, it has to increase light source consumption in the prior art light-guiding device, causing the reduction of battery life in the electronic devices, and meanwhile, generating more unnecessary heat therein. As a result, it is required to propose a structure design with improved light loss level, in order to increase the ratio of light usage.

Figure 2:
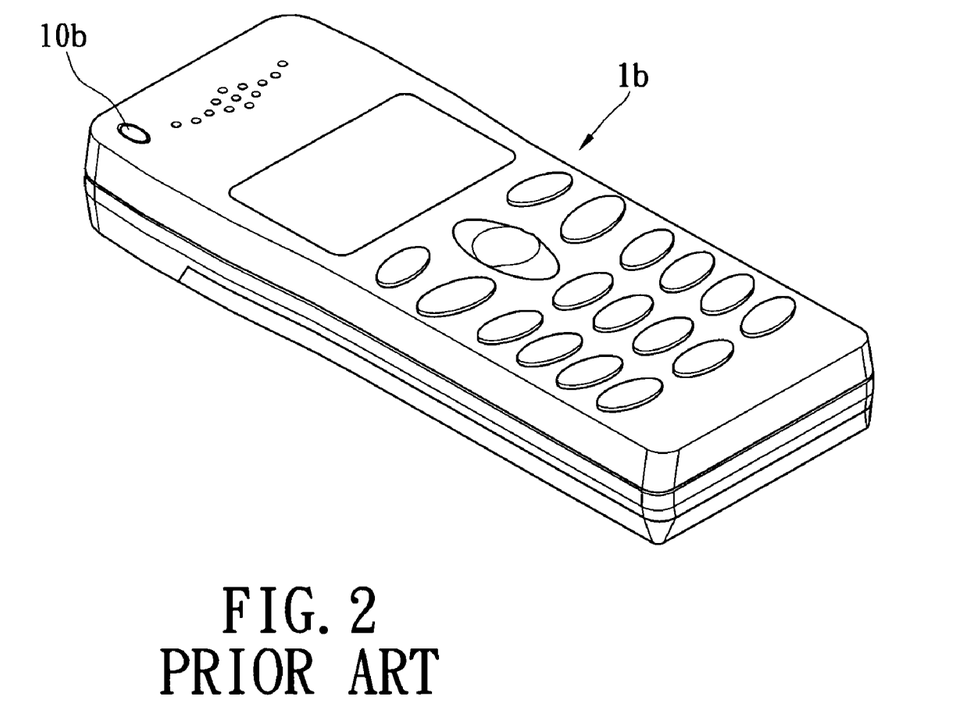
FIG. 2 is a perspective diagram of a light-guiding device used in a mobile phone.
Figure 3:
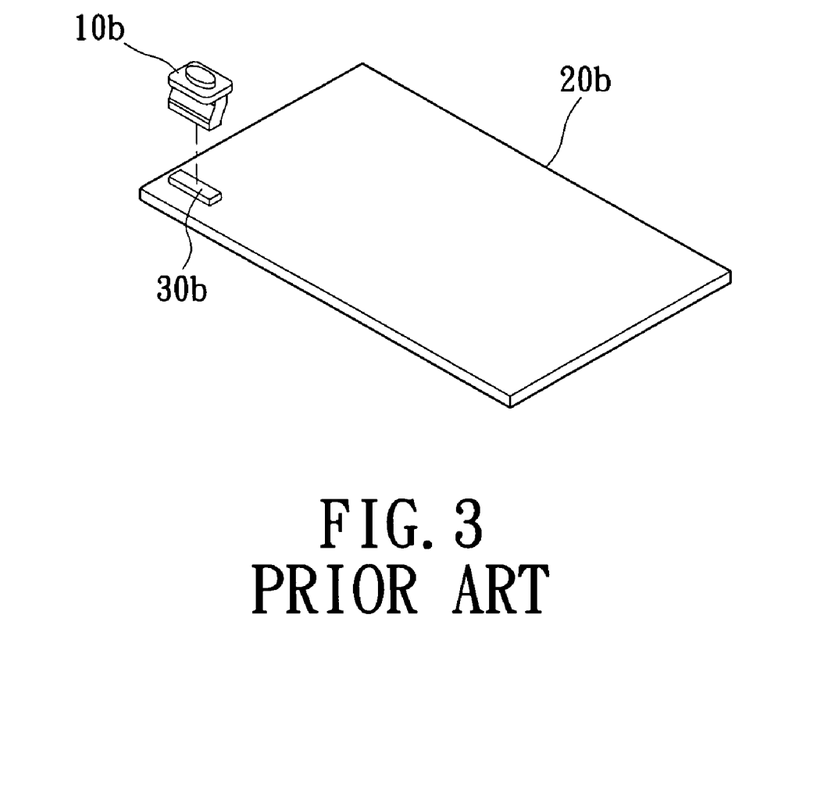
FIG. 3 is a perspective diagram of the light-guiding device in the mobile phone, as shown in FIG. 2.
Figure 4:
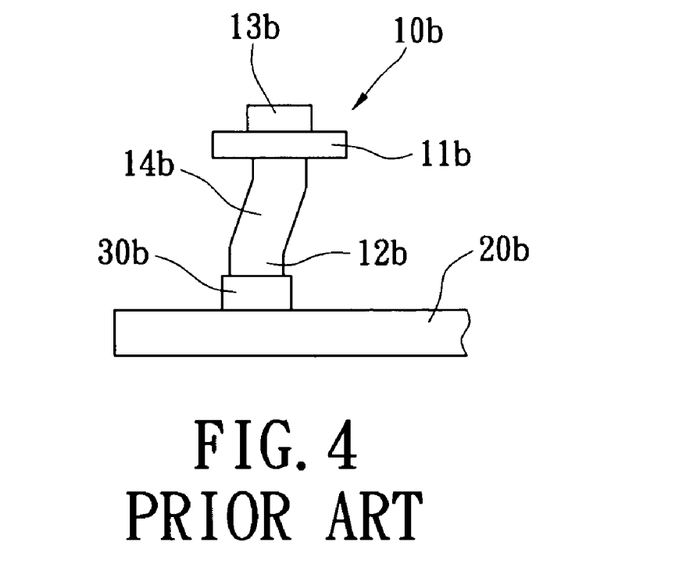
FIG. 4 is a diagram of the conjunction of light-guiding device, circuit board and light-emitting component, as shown in FIG. 3.

Refer to FIGS. 2 to 4, wherein a perspective diagram of a light-guiding device commonly used in a mobile phone 1b, a perspective diagram of a light-guiding device 10b disposed in a mobile phone 1b, and a diagram of the conjunction of light-guiding device 10b, circuit board 20b and light-emitting component 30b are respectively shown. Herein the light-guiding device 10b provides the lighting effect on the mobile phone 1b for charging or standby indication. As illustrated in the Figures, essentially, the light-guiding device 10b has a light guide structure, which is disposed within the mobile phone 1b and placed on a circuit board 20b, with correspondence to the a light-emitting component 30b. The light-guiding device 10b comprises: a body 11b, a receiving end 12b disposed on the bottom of the body 11b, a light-emitting end 13b disposed on the top of the body 11b, and a connecting end 14b disposed between the receiving end 12b and the light-emitting end 13b. The receiving end 12b corresponds to the light-emitting component 30b to receive emitted light, and through the guidance of the connecting end 14b, it allows light to emit at the light-emitting end 13b, providing lighting effect for users.

However, from the design of the light-guiding device 10b, it can be seen that it provides merely one axial light-emitting display. In other words, it can offer light-emitting prompt only through light-emitting effect on one single axial plane (e.g. front side) of the mobile phone 1b. Due to the angle of sight, when the mobile phone 1b is rotated to a certain angle, the surface brightness decreases because of the restriction of reflection angle, thus it can not easily provide effective light-emitting result on other axle (for example, from lateral direction), causing inconvenience for users in the course of observation.

From the above-stated description, it can be appreciated that the prior art light-guiding device, in practical use, has several inconvenience and defects. In view of such inconvenience and defects, it is required to design a light guide structure capable of performing multi-axial light-emitting display, thereby improving the disadvantage of inconvenience due to the angle of sight, which allows light-emitting display only on one axial plane; additionally, reducing the high light loss ration during the course of light guidance in the light guide, further enhancing the efficiency of light emission in light guide.

SUMMARY OF THE INVENTION

The object of the present invention is to design a multi-axial light guide module, which, through the design of multi-axial light-emitting plane of the light-emitting portion in the light guide structure, it is possible to allow said light guide structure to have a plurality of light-emitting axial planes, so as to respectively generate light-emitting effect on different axial surfaces, which presents multi-axial light-emitting display in conjunction with the display unit, and allows users to observe the light-emitting display from different axial planes without restriction of angle of sight, achieving the effects of message prompt and indication.

Another object of the present invention is to arbitrarily guide the emitted light to any prescribed position or area through designated curved structure in the design of the light guide structure according to the present invention; meanwhile, reduce the high light loss ratio occurred during the light guidance of light source in the light guide, thereby providing improved efficiency of light emission.

Yet another object of the present invention is to use the design of light-guiding unit, in conjunction with curved structure variation in the light guide, to significantly increase the efficiency of light guidance and enhance the light emission effect thereof.

To achieve the objects described supra, the present invention provides a multi-axial light guide module, comprising: a light guide, a display unit and a light-guiding unit. The light guide has a light-emitting portion, connects to a curved portion, wherein the light-emitting portion has a first axial light-emitting plane and a second axial light-emitting plane. The display unit corresponds to the light-emitting portion of the light guide, and the display unit has a first and a second axial display layers, in which the first axial display layer corresponds to the first axial light-emitting plane, and the second axial display layer corresponds to the second axial light-emitting plane, used to respectively display the light source emitted from the first and second axial light-emitting planes. The light-guiding unit is disposed on the light-emitting portion of the light guide, for increasing the efficiency of light emission in the light guide.

To achieve the above-mentioned objects, the present invention further provides a multi-axial light guide module, comprising: a light guide, a light-guiding unit and a display unit. The light guide is of curved shape and has a light-emitting portion, in which the light-emitting portion has at least two axial light-emitting planes; the light-guiding unit is disposed on the light guide and corresponds to at least one axial light-emitting plane of the light-emitting portion, for increasing the efficiency of light emission of the light-emitting portion; the display unit corresponds to each axial light-emitting plane of the light-emitting portion for displaying the light source emitted from the axial light-emitting plane.

Thereby, through the plurality of axial light-emitting planes of the light-emitting portion in the above-mentioned light guide, in conjunction with the light-guiding unit and display unit, it is possible to significantly increase the efficiency of light guidance and light emission, and enhance the effect of light-emitting display.

For further understanding the technologies, means and effects taken by the present invention to achieve the prescribed objects, references are made to the subsequent detailed descriptions and appended drawings of the present application, and it is convinced that the objectives, characteristics and features of the present invention can be thoroughly and concretely appreciated; whereas, the appended drawings are provided merely for the purpose of reference and illustration, without any intention to restrict the scope of present invention thereto.

DETAILED DESCRIPTION OF PREFERRED EMBODIMENTS

To further and better understand the characteristics and technical contents of the present invention, refer now to FIGS. 5 to 10 of the present invention for the diagrams shown therein and detailed descriptions thereof.

Figure 5:
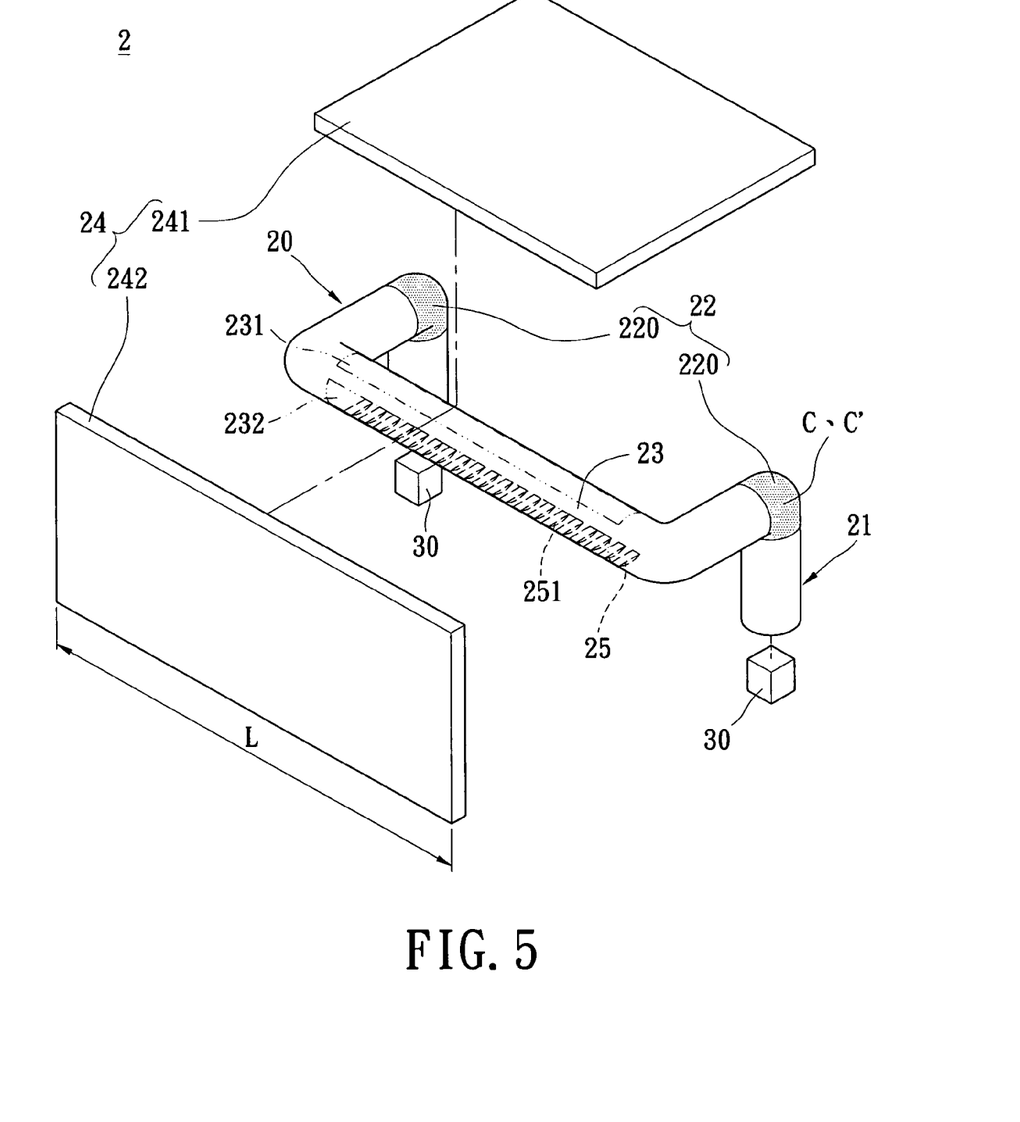
FIG. 5 is a perspective diagram of a first embodiment of multi-axial light guide module according to the present invention.
Figure 6:
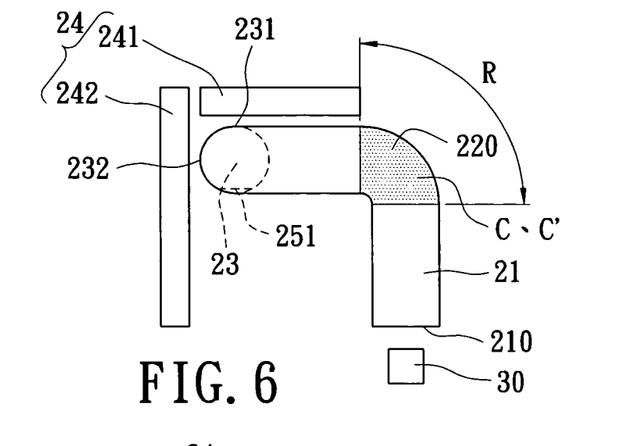
FIG. 6 is a front view diagram of the first embodiment of multi-axial light guide module according to the present invention.
Figure 7:
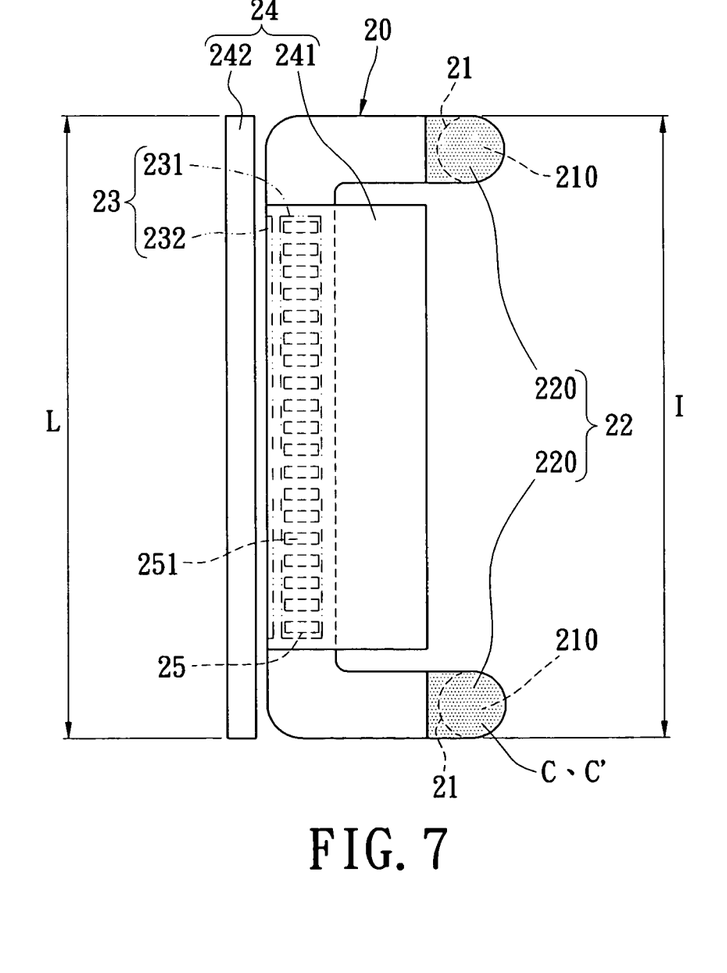
FIG. 7 is a top view diagram of the first embodiment of multi-axial light guide module according to the present invention.

Referring now to FIGS. 5 to 7, perspective diagram, front view diagram and top view diagram for the first embodiment of light guide module according to the present invention are therein respectively illustrates. For said diagrams, the light guide module 2 comprises: a light guide structure 20, a display unit 24 corresponding to the light guide structure 20, and a light-guiding unit 25 disposed on the light guide structure 20.

In the embodiment of the present invention, the light guide structure 20 comprises a receiving portion 21, a curved portion 22 and a light-emitting portion 23. The receiving portion 21 has two receiving sections 210, and the surface of each receiving section respectively corresponds to a light-emitting component 30 for receiving the light emitted from the light-emitting component 30. The curved portion 22 is connected between the receiving portion 21 and the light-emitting portion 23; in the present embodiment, the curved portion 22 is in a shape of arc and has two curved sections 220 mutually parallel and spaced, wherein one side of each curved section 220 is connected to each receiving section 210 of the receiving portion 21. Through the design of the curved portion 22, it is possible to let the light guide structure 20 arbitrarily extend to a prescribed position or area, for transferring the light source received by the receiving portion 21 to such a prescribed position or area.

However, the illustrated shape of the curved portion 22 is simply a preferred embodiment of the present invention, and the present invention is by no means restricted thereto. Designers may modify the shape of the curved portion 22 as actual need in order to guide the light to any desired position or area.

Besides, the light-emitting portion 23 is formed by extending the curved portion 22; in the present embodiment, the light-emitting portion 23 is formed by extending respectively through the other sides of the two curved sections 220 of the curved portion 22. In the design of the present invention, the light guide structure 20 may emit light sources of multiple prescribed axial planes through the light-emitting portion 23. In the present embodiment, the light-emitting portion 23 is defined as having at least two axial light-emitting planes along different directions, so as to generate light emission of at least two axial planes, or directional planes. In the design of the preferred embodiment, the light-emitting portion 23 may have a first axial light-emitting plane 231, which can be called first-directional light-emitting plane, and a second axial light-emitting plane 232 which can be called second-directional light-emitting plane. From FIG. 6, it can be clearly seen that the first and second axial light-emitting planes 231, 232 may be mutually vertical, so as to clearly present two vertical axial light-emitting planes; however, this is simply one preferred embodiment, and the angle formed between the first and second axial light-emitting planes 231, 232 is not limited thereto.

Hereby, when the light-emitting component 30 emits light source to the light guide structure 20, it uses surface of each receiving section 210 to receive the emitted light source; then, through the arc design on the curved section 220 of the curved portion 22, the light source may be arbitrarily guided to any location or area prescribed by users; finally, the light source is guided to the light-emitting portion 23 formed by extending the curved section 220, such that the light source can be emitted from different axial planes of the light-emitting portion 23 through the first and second axial light-emitting planes 231, 232 of the light-emitting portion 23, allowing the light guide structure 20 to show the light-emitting effect of at least two different axial planes.

The display unit 24 corresponds to the surface of the light-emitting portion 23 in the light guide structure 20, which is used to show the light source emitted by the light-emitting portion 23. In the present invention, the display unit 24 has at least two axial or directional display layers respectively corresponding to the axial light-emitting planes 231, 232. In the present embodiment, the display unit 24 has a first axial display layer 241, which can be called first-directional display layer, and a second axial display layer 242, which can be called second-directional display layer. The first axial display layer 241 corresponds to the first axial light-emitting plane 231, and the second axial display layer 242 corresponds to the second axial light-emitting plane 232, so as to respectively display the light sources emitted by the first and second axial light-emitting planes 231, 232.

The first axial display layer 241 can be defined as a forward display plane, and the second axial display layer 242 can be defined as a lateral display plane, such that the user may selectively observe the displayed light source with ease from one of the forward or lateral display plane, thus achieving the effects of message prompt and indication.

In the present invention, the display unit 24 can be disposed onto a shell (not shown), and the display unit 24 may have a transparent film for displaying light source. In the present embodiment, each of the first and second axial display layers 241, 242 of the display unit 24 is respectively a transparent film, which may be placed on said shell by way of printing or other similarly effective approach, for transferring the light source, such that the multi-axial light source emitted from the light-emitting portion 23 of the light guide structure 20 can be displayed via the first and second axial display layers 241, 242, thus obtaining the display effect of multi-axial plane.

The light-guiding unit 25 is disposed on the surface of the light-emitting portion 23, used to increase the light guidance effect for light source on the surface of the light-emitting portion 23, so as to enhance the entire light emission efficiency of the light-emitting portion 23. In the present embodiment, the light-guiding unit 25 has a first light-guiding section 251 which is disposed on the surface of the light-emitting portion 23 and corresponds to the first axial light-emitting plane 231. Herein, the first light-guiding section 251 has a light-guiding micro-structure array. The light-guiding micro-structure array can be a vortex-shaped array, a square array, a beehive-shaped array or any array composed in any interlaced arrangement. Through the design of various type of the light-guiding micro-structure array, it is possible to enhance the effect of light guidance on the first axial light-emitting plane 231, allowing the corresponding first axial display layer 241 to present better light-emitting effect.

Additionally, the curved portion 22 has two curved sections 220 which are mutually parallel and spaced. Herein there is an interval I between the outer edges of the two curved sections 220, and the first axial display layer 241 not only corresponds to the first axial light-emitting plane 231, it also further extends a display length L, in which the display length L corresponds to the interval I between the two curved sections 220, such that the light source transferring through these two curved sections 220 can be displayed onto the first axial display layer 241, so as to enhance the light emission effect of the first axial display layer 241, reducing waste caused by light loss.

Furthermore, during the course of light guidance in the light guide structure 20, high ratio of light loss is inevitably occurred in light source at the curved portion 22. To solve the problem, the light guide structure 20 particularly has a reflection means for improving its light reflection ability, which is designed at the part of the curved portion 22, in which said reflection means comprises:

1. coating with a white paint film C or reflection film C' respectively on the surfaces of the curved sections 220, such that, as light passes through the curved portion 22, it can significantly refract or reflect, so as to reduce the transfer of light through the surface of the curved portion 22, increasing the reflection level of the curved sections 220 in the curved portion 22, lowering excessive light loss caused of the transfer of light transferring through the curved sections 220;

2. in addition to the above-said coating approach, it is also possible to design the curvature of each curved section 220 in the curved portion 22 as a specific curvature R for the enhancement of light source reflection, wherein the curvature R can be varied based on practical needs. Therefore, by means of the variation of the curvature R on the curved section 220, as light source passes through the curve parts of the light guide structure 20, it significantly reflects or refracts, which results in reducing the transfer of light penetrating through the surface of the curved portion 22, thus increasing the light reflection in the curved portion 22.

Figure 8:
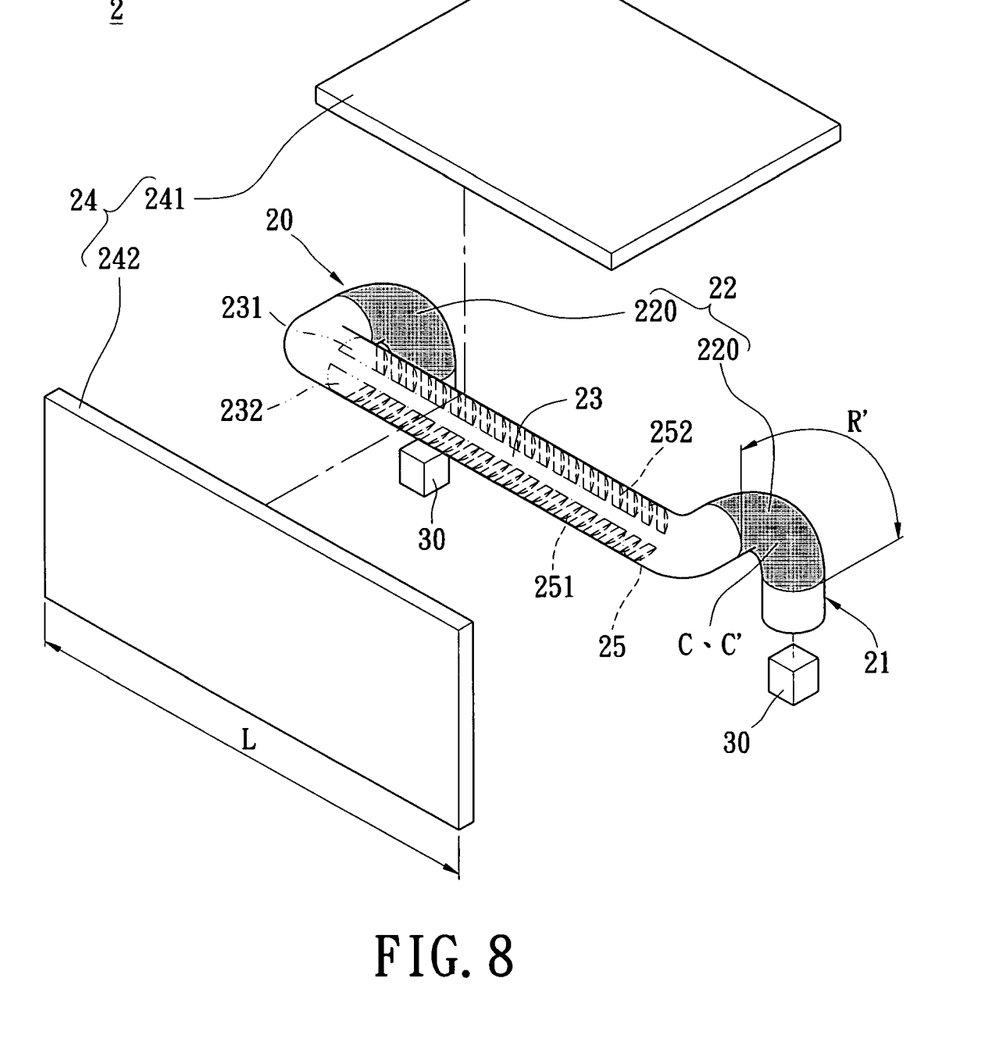
FIG. 8 is a perspective diagram of a second embodiment of multi-axial light guide module according to the present invention.
Figure 9:
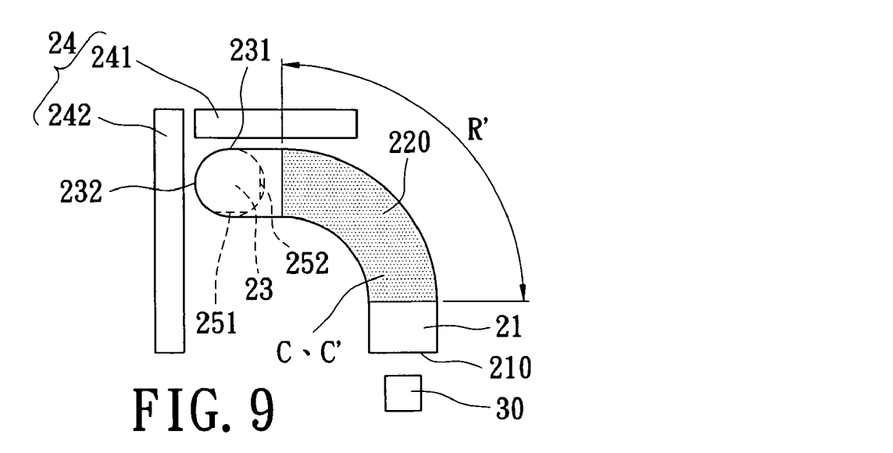
FIG. 9 is a front view diagram of the second embodiment of multi-axial light guide module according to the present invention.
Figure 10:
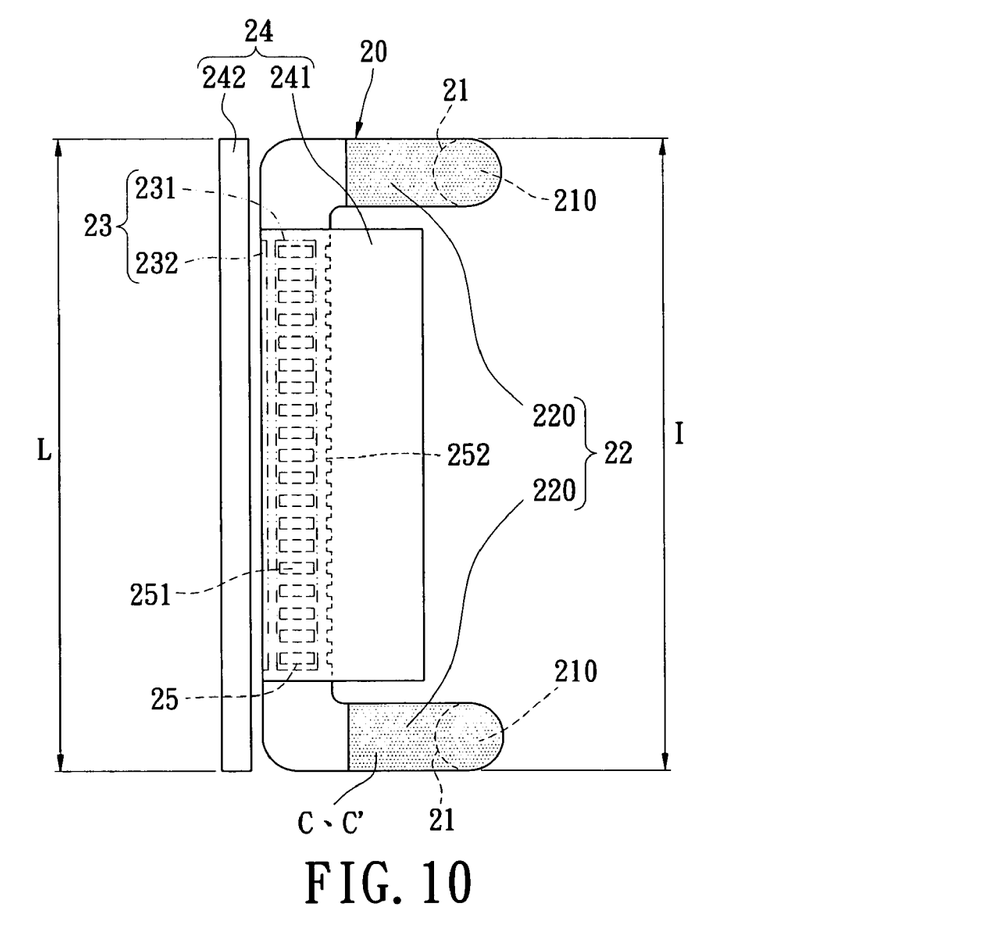
FIG. 10 is a top view diagram of the second embodiment of multi-axial light guide module according to the present invention.

Referring now to FIGS. 8 to 10, a perspective diagram, a front view diagram and a top view diagram of a second embodiment of multi-axial light guide module according to the present invention are shown. From these Figures, it can be seen the major differences between the second embodiment and the first embodiment are:

In the light-emitting portion 23 of the light guide structure 20, in addition to disposition of the first light-guiding section 251 on the first axial light-emitting plane 231, the light-guiding unit 25 also has a second light-guiding section 252 disposed on the surface of the light-emitting portion 23 and placed in opposition to the second axial light-emitting plane 232, in which the structure of the second light-guiding section 252 is identical to the one found in the first light-guiding section 251. Similarly, this can enhance the light-guiding effect of the second axial light-emitting plane 232 and thus enhance the light-emitting efficiency thereof, enabling uniform light-emitting efficiency in the first and second axial light-emitting planes 231, 232.

Besides, on the curved portion 22, the curvature R noted in the curved section 220 of the first embodiment is modified to be another bigger curvature R', which similarly, owing to the bigger design of curvature R', as light source passes this curved portion, the probability of light transfer through its surface can be reduced, resulting in lower light loss ratio, thus enhancing the likelihood of the light reflection or refraction to the light-emitting portion 23. The light emission and display efficiency achieved in the second embodiment are equivalent to the effect found in the first embodiment.

In summary, through the design of the curved portion and the light-emitting portion in the light guide structure, with the light-guiding unit and the display unit arranged in conjunction, the multi-axial light guide module according to the present invention provides the following aspects:

1. generating light-emitting effect respectively on different axial surfaces through the multiple light-emitting axial planes of the light guide structure. Also, in conjunction with the display unit, it presents multi-axial light-emitting display, users may conveniently observe the light-emitting display from different angles, thereby achieving the message prompt and indication effects;

2. using curve-shaped design in the light guide structure, it is possible to arbitrarily guide light source to any prescribed position or area. At the same time, light loss ratio of light source in the light guide can be reduced, enhancing efficiency of light emission in the light guide;

3. using the variation of curve structure in the light guide and light-guiding unit design, thus improving efficiency of light guidance;

4. employing, in the display unit, the correlation between the axial display layer and the curved portion of the light guide structure, so the efficiency of light-emitting display can be improved, allowing users to see a better light-emitting display result from different axles.

The aforementioned descriptions set out the detailed illustrations and drawings of some preferred embodiments according to the present invention, but the present invention is by no means limited thereto, nor should they be used to restrict the present invention. The scope of present invention should be defined based on the subsequent claims, and all embodiments belonging to scope of the claims in the present application as well as similar variations, modifications and/or alternations thereof that those skilled in the art can conveniently consider are deemed to be encompassed by the scope of the present invention as delineated in the claims stated hereunder.

What is claimed is:

1. A light guide module with multi-directional light-emitting areas, comprising:
   a light guide, having a receiving portion for receiving a light from a light source, a curved portion extended and bent from the receiving portion, and a light-emitting portion connecting to the curved portion, wherein the light-emitting portion is formed with a light-guiding unit on an outer surface thereof, a first-directional light-emitting plane formed an outer surface thereof and perpendicular to a first direction, and a second-directional light-emitting plane perpendicular to a second direction adjacent to the first-directional light emitting plane, wherein the light-guiding unit directs the light toward the first-directional and second-directional light emitting plans;
   a display unit, having a first-directional display layer disposed adjacent to the first-directional light-emitting plane and a second-directional display layer disposed adjacent to the second-directional light-emitting plane, for respectively displaying the light from the first and second-directional light-emitting planes;
   wherein the curved portion has a reflection means for improving reflection of the light and guides the light along the second direction;
   wherein the second-directional display layer has a lateral end extended beyond the light-guiding unit and faced the curved portion.

2. The light guide module with multi-directional light-emitting areas according to claim 1, wherein the reflection means has a coating with white paint film or reflection film on the surface of the curved portion in the light guide, for increasing the reflection of light source at the curved portion.

3. The light guide module with multi-directional light-emitting areas according to claim 1, wherein the reflection means has a curvature for enhancing the reflection of the light.

4. The light guide module with multi-directional light-emitting areas according to claim 1, wherein the light-guiding unit has a first light-guiding section formed on the light-emitting portion and placed in opposition to the first-directional light-emitting plane, for increasing the efficiency of light emission in the first-directional light-emitting plane.

5. The light guide module with multi-directional light-emitting areas according to claim 4, wherein the first light-guiding section has a light-guiding micro-structure array.

6. The light guide module with multi-directional light-emitting areas according to claim 1, wherein the light-guiding unit has a second light-guiding section formed on the light-emitting portion and placed in opposition to the second-directional light-emitting plane, for increasing the efficiency of light emission in the second-directional light-emitting plane.

7. The light guide module with multi-directional light-emitting areas according to claim 6, wherein the second light-guiding section has a light-guiding micro-structure array.

8. The light guide module with multi-directional light-emitting areas according to claim 1, wherein the curved portion has another curved section connected to another end of the light-emitting portion, wherein the two curved sections spaced in parallel, and the second directional display layer has two lateral ends extended beyond the light-emitting portion and faced to the two curved sections respectively.

9. The light guide module with multi-directional light-emitting areas according to claim 1, wherein the first and second-directional display layer respectively has a transparent film for transferring the light source.

10. A shell of electronic device having a light guide module with multi-directional light-emitting areas, comprising:
    a light guide of curved shape, having a light-emitting portion, two curved sections spaced in parallel and connected to two ends of the light-emitting portion, and a light-guiding unit; wherein the light-emitting portion has at least two light-emitting planes; wherein the light-guiding unit is formed on a periphery thereof to guide light to the at least one axial light-emitting planes, for increasing the efficiency of light emission of the light-emitting portion; and
    a display unit, having at least two display layers disposed substantially perpendicular to the light-emitting planes respectively, for displaying the light from the light-emitting planes respectively;
    wherein the two curved sections are spaced in parallel and connected to two ends of the light-emitting portion, wherein each of the curved sections guides the light to a predetermined direction, one of the display layers has two lateral ends extended beyond the light-emitting portion and faced with the two curved sections respectively;
    wherein one of the display layer has a length corresponding to that of the light-guiding unit.

11. The shell of electronic device having a light guide module according to claim 10, wherein the light-guiding unit has at least two light-guiding sections formed on the light-emitting portion and placed in opposition to the at least two light-emitting planes, and each of the light-guiding sections has a light-guiding micro-structure array.

12. The shell of electronic device having a light guide module according to claim 10, wherein each of the display layers is a transparent film for transferring the light source.

13. The shell of electronic device having a light guide module according to claim 10, wherein the light guide has two receiving sections connected to the curved portions respectively for receiving light source.

14. The shell of electronic device having a light guide module according to claim 10, wherein each of the curved portions has a reflection means for improving the level of light source reflection therein, and the reflection means has a white paint film or a reflection film coated on the surface of each curved section, for increasing the reflection of light source at the curved section.

15. The shell of electronic device having a light guide module according to claim 10, wherein each of the curved portion has a reflection means for improving the level of light source reflection therein, and the reflection means having a curvature for enhancing the level of light source reflection.

* * * * *